United States Patent

[11] 3,594,985

[72] Inventors Jameil Ameen;
Seymour A. Furbush, both of Hopewell, Va.
[21] Appl. No. 832,368
[22] Filed June 11, 1969
[45] Patented July 27, 1971
[73] Assignee Allied Chemical Corporation
New York, N.Y.

[54] ACID GAS REMOVAL FROM GAS MIXTURES
8 Claims, 1 Drawing Fig.
[52] U.S. Cl. .................................................... 55/44,
55/73, 55/93
[51] Int. Cl. ..................................................... B01d 53/00
[50] Field of Search .......................................... 23/3; 55/19,
21, 48, 56, 68, 73, 44, 93

[56] References Cited
UNITED STATES PATENTS
2,781,863  2/1957  Bloch et al. .................... 55/73 X
3,362,133  1/1968  Kutsher et al. ................. 55/48 X
3,435,590  4/1969  Smith ............................ 55/43
3,533,732  10/1970 Moore et al. ................... 55/73 X Primary Examiner—Reuben Friedman
Assistant Examiner—R. W. Burks
Attorneys—Arthur J. Plantamura and John J. Lipari ABSTRACT: An improved solvent and process for treating and separating acid gas, particularly hydrogen sulfide from gas mixtures containing the same, such as natural gas mixtures containing hydrogen sulfide, carbon dioxide and methane. The process involves the use of a solvent comprising a mixture of dimethyl ethers of polyethylene glycols to absorb the hydrogen sulfide and part of the carbon dioxide under superatmospheric pressure. The solvent containing dissolved hydrogen sulfide and carbon dioxide is flashed at reduced pressure to remove most of the carbon dioxide and produce a "semilean" solvent. Part of the semilean solvent is recycled to an intermediate part of the absorber; the remaining semilean solvent containing hydrogen sulfide is subjected to an oxygen containing gas under conditions that result in complete removal of the hydrogen sulfide to produce a "lean" solvent. The lean solvent is recycled to the top of the absorber. By the use of two solvent feeds to the absorber, the economy of the process is improved.

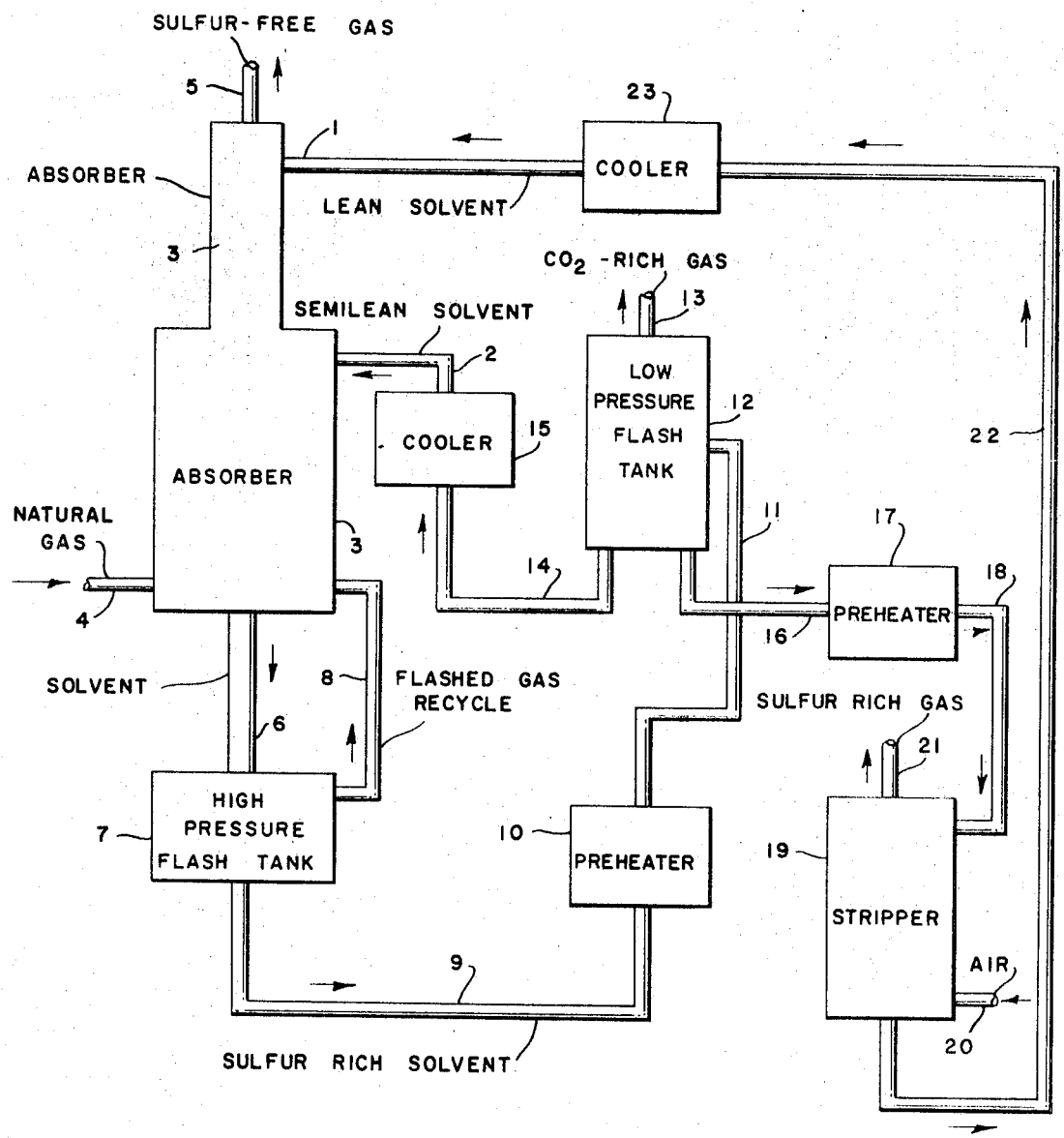

ACID GAS REMOVAL FROM GAS MIXTURES

CROSS REFERENCE TO RELATED APPLICATIONS

This application is related to U.S. application Ser. No. 747,063 filed June 21, 1968, now U.S. Pat. No. 3,533,732, on a process for treating and separating hydrogen sulfide from natural gas mixtures. It is also related to U.S. application Ser. No. 771,326 filed Oct. 28, 1968, on a process for the preparation of dialkyl ethers of polyalkylene glycols.

BACKGROUND OF THE INVENTION

This invention relates to use of mixtures of dimethyl ethers of polyethylene glycols for separating acidic such as hydrogen sulfide from gas mixtures.

Mixtures of hydrogen sulfide with other gases, such as carbon dioxide and methane, are found in a number of industries. For example, mixtures of hydrogen sulfide, carbon dioxide, water, and methane are found as natural gases. It is frequently necessary to remove $H_2S$ from gas mixtures for the purpose of purifying the gas mixture or recovering the $H_2S$ or both. For example, it is often necessary to purify a gaseous hydrocarbon stream to produce sweet, dry gas which will not poison certain catalysts and will meet the usual pipeline specifications and it is sometimes advantageous to recover the $H_2S$ as a source of elemental sulfur. In particular, in the separation of $H_2S$ from sour natural gas, economies can be realized by selectively separating the $H_2S$ without removing all of the carbon dioxide.

Dialkyl ethers of polyalkylene glycols are excellent solvents for removal of acid gases such as carbon dioxide, hydrogen sulfide, sulfur dioxide, etc., from gaseous mixtures. For example, the dimethyl ether of polethylene glycol is particularly advantageous in the removal of hydrogen sulfide from sour natural gas, in the manner of Kutsher and Smith U.S. Pat. No. 3,362,133.

The absorption of hydrogen sulfide in dialkyl ethers of a polyalkylene glycol is also disclosed in Canadian Pat. No. 681,438 to Worley, and in U.S. Pat. No. 2,781,863 and U.S. Pat. No. 2,946,652 to Bloch. Worley and Bloch teach heating and release of pressure as a method of desorbing the gas, and Block also teaches regeneration of the spent absorbent by stripping with an inert gas, including air.

Although dimethyl ethers of polyethylene glycol have been suggested for removal of hydrogen sulfide from gas mixtures, their use has been inhibited by certain disadvantages. The lower molecular weight homologs are relatively volatile so that excessive solvent losses may occur during gas processing. Higher molecular weight homologs are not excessively volatile; however, unfortunately, they are rather viscous. The high viscosity tends to reduce the rate of solvent flow through the gas absorber so that less gas can be treated. Advantageously, it would be desirable to find a means to lower the viscosity of the higher molecular weight homologs. Desirably, the solvent should have a vapor pressure less than 0.01 mm. Hg. under process conditions and a viscosity approaching the viscosity of water.

SUMMARY OF THE INVENTION

The improved solvent composition of the instant invention is essentially a mixture of dimethyl ethers of polyethylene glycols of the formula $$CH_3O(C_2H_4O)_xCH_3$$

wherein $x$ is between 3 and 9 The homolog distribution is approximately as follows:

Homolog Distribution, $CH_3O(C_2H_4O)_x CH_3$

| $x$ | Molecular Homolog. Wt. % |
| --- | --- |
| 3 | 4—9 |
| 4 | 22—24 |
| 5 | 24—28 |
| 6 | 20—22 |
| 7 | 13—15 |
| 8 | 6—8 |
| 9 | 2—4 |

Minor amounts of lower and higher homologs may be tolerated, specifically the percent homolog where $x$ is less than 3 shall not exceed 1 percent, preferably less than 0.5 percent, and where $x$ is greater than 9 shall not exceed 3 percent, preferably less than 1 percent.

The instant solvent composition has a vapor pressure less than 0.01 mm. Hg. at temperatures up to 110° F. and a viscosity of between 5 and 10 centipoises, preferably between 7.5 and 8.5 centipoises at 60° F.

It has been discovered that carbon dioxide may be dissolved in the solvent composition under superatmospheric pressure to lower the viscosity to about 1—5 centipoises at ambient temperatures.

The instant solvent compositions may be used in known processes for separating hydrogen sulfide from gases. However, because of its relatively high viscosity, the solvent is desirably used in a novel process designed to maintain sufficient carbon dioxide dissolved in the solvent to lower its viscosity. Such a process is a part of the present invention.

In accordance with this invention, a process for removing acid gas from a gas mixture containing the same which comprises the steps of:

a. contacting said gaseous mixture in a first absorption zone under superatmospheric pressure with a solvent comprising a mixture of dimethyl ethers of polyethylene glycols having dissolved therein at least 1 weight percent acid gas to effect absorption of most of the acid gas so as to partially purify the gas;

b. contacting said partially purified gas from the first absorption zone in a second absorption zone under superatmospheric pressure with a solvent comprising a mixture of dimethyl ethers of polyethylene glycols containing less than 1 weight percent acid gas to produce a purified gas;

c. passing the solvent containing dissolved gases from the second absorption zone to the first absorption zone;

d. passing the solvent containing dissolved acid gas from the first absorption zone to a flashing zone maintained at a pressure substantially lower than that in the first absorption zone to effect liberation of most of the acid gas therefrom;

e. withdrawing from said flashing zone gases liberated therein;

f. passing a major portion of solvent containing at least 1 weight percent acid gas from said flashing zone to said first absorption zone;

g. passing a minor portion of solvent containing at least 1 weight percent acid gas from said flashing zone to a stripping zone;

h. stripping substantially all of the acid gas from said minor portion of solvent; and i. returning desorbed solvent to the second absorption zone for further contact with the gaseous mixture.

BRIEF DESCRIPTION OF THE DRAWING

The accompanying drawing is a diagrammatic flow sheet illustrating one method of practicing the present invention.

DESCRIPTION OF PREFERRED EMBODIMENT

The mixture of dimethyl ethers of polyethylene glycols of the present invention is prepared from the corresponding monomethyl ethers of polyethylene glycols by reacting the monomethyl ether, with sodium to form the sodium alcoholate thereof, reacting the sodium alcoholate with methyl chloride to form the dimethyl ethers and sodium chloride, and separating the sodium chloride from the dimethyl ethers. Preferably, about 0.1—0.6 weight percent of water is incorporated in the monomethyl ethers, and the reaction temperature is maintained at about 100°—120° C.

The mixture of monomethyl ethers of polyethylene glycols from which the diethers are derived may be prepared from ethylene oxide and methanol. About 4.5 mols of ethylene oxide is reacted with 1 mol of methanol at about 110°—140° C. using sodium hydroxide as catalyst. The resulting product is distilled at about 10 mm. Hg. pressure to remove all of the low-boiling compounds, together with most of the monomethyl ether of triethylene glycol. The residue is suitable for preparation of the dimethyl ethers of the present invention as previously described.

An example of the important physical properties of the solvent composition are listed below:

| | |
|---|---|
| Vapor Pressure, 77° F., mm. Hg | Less than 0.01 |
| Viscosity, 59° F., Cp | 8.3 |
| Viscosity, 90° F., Cp | 4.7 |
| Specific Heat, 41° F. | 0.49 |
| Freezing Point, ° F. | −8 to −20 |
| Pounds per gallon, 77° F. | 8.6 |
| Flash Point, ° F., (COC) | 304 |

It was found that dissolved carbon dioxide lowers the viscosity of the instant solvent to about 1—5 centipoises depending on the partial pressure of carbon dioxide. Preferably, at least 1 weight percent carbon dioxide is dissolved in the solvent, as described in the instant process for purification of gas containing hydrogen sulfide and carbon dioxide.

The solubility of carbon dioxide and hydrogen sulfide in the solvent composition varies with the temperature and the partial pressure of the gases as shown in the following table:

Equilibrium Solubility of $CO_2$ and $H_2S$ in Solvent at 81°, 100°, and 120° F.

| Gas mixture, mol percent | Total pressure, p.s.i.a. | Temperature, ° F. | Dissolved gas in liquid | Wt. percent |
|---|---|---|---|---|
| $H_2S$ 80.2 | 96 | 81 | $H_2S$ | 14.3 |
| $CO_2$ 19.8 | | | $CO_2$ | 1.13 |
| $H_2S$ 9.4 | 212 | 81 | $H_2S$ | 3.33 |
| $CO_2$ 90.6 | | | $CO_2$ | 7.26 |
| $H_2S$ 40.4 | 57 | 100 | $H_2S$ | 3.45 |
| $CO_2$ 59.6 | | | $CO_2$ | 1.16 |
| $H_2S$ 32.5 | 323 | 120 | $H_2S$ | 11.3 |
| $CO_2$ 67.5 | | | $CO_2$ | 6.43 |

As a preferred embodiment, the present process for hydrogen sulfide removal from natural gas may be effectively carried out by contacting the gaseous mixture in an absorption tower containing 20—40 plates with the solvent at a pressure of 500—1,500 p.s.i.a. Total solvent fed to the absorption tower is preferably 1.5—4.5 lbs. of solvent per standard cubic foot of acid gas to be absorbed. About 90—95 percent of the solvent that is recycled to the absorption tower contains at least 1 weight percent carbon dioxide, and this portion of the solvent is fed to an intermediate portion of the tower which is semilean with respect to carbon dioxide content. The residual 5—10 percent of the solvent is fed to the top of the absorption tower after having been stripped essentially free of acid gases, particularly hydrogen sulfide. Temperature in the absorption zone is preferably maintained at about 35°—120° F.

Thereafter, solvent from the absorption tower is reduced in pressure in one or more flashing zones. Flashing initially produces a mixture of methane and carbon dioxide which may be recycled to the absorption tower. Flashing at lower pressures of 15—30 p.s.i.a. releases most of the carbon dioxide. Preferably, the solvent after flashing contains about 1—3 weight percent carbon dioxide, based on the total weight of the mixture.

The residual solvent from the flashing zones containing hydrogen sulfide and carbon dioxide is passed to a stripping zone maintained at about atmospheric pressure or lower, wherein the solvent is stripped with air preferably at a temperature of about 100°—190° F.

About 0.2—2 standard cubic feet of stripping air per pound of solvent is utilized to effect removal of the absorbed gas from the solvent. A 15—25-foot packed stripping column is generally preferred. Desorbed solvent preferably containing 1—10 p.p.m. hydrogen sulfide is returned to the top of the absorption tower for further contact with the gaseous mixture. This procedure permits production of sweet gas containing about 2.5—5.0 percent carbon dioxide and 1—4 p.p.m. hydrogen sulfide. By use of two solvent feeds to the absorber, one well-stripped and the other partially stripped, the economy of the process is improved.

The following description of our preferred process is with reference to the drawing which is a diagrammatic flow sheet illustrating one method of practicing the present invention.

Natural gas containing carbon dioxide and hydrogen sulfide enters through line 4 at the bottom of an absorption column 3 containing 20—40 plates. Well-stripped solvent containing essentially no hydrogen sulfide is fed through line 1 to the top of absorption column 3, and partially stripped solvent containing at least about 1 weight percent carbon dioxide is fed through line 2 to the upper middle portion of absorption column 3. Total solvent fed to the absorption column is about 1.5—4.5 lbs. of solvent per standard cubic foot of carbon dioxide and hydrogen sulfide to be absorbed. About 90—95 percent of the total solvent is fed through line 2, the residual being well-stripped solvent fed through line 1. Preferably, the upper portion of the absorption column is reduced in diameter because of the reduced solvent flow to this section. The incoming solvent temperature will be about 45° to 70° F. Discharging solvent temperature will be about 20° F. higher than inlet solvent temperatures. The column is operated at a pressure usually in the range 500—1500 p.s.i.a. The solvent leaving the bottom of the absorber through line 6 is rich in carbon dioxide and hydrogen sulfide. The gas effluent leaving through line 5 from the top of the absorber will contain about 2.5—5.0 volume percent carbon dioxide and will be essentially sulfur free.

The solvent discharged from the absorber through line 6 is flashed in the high-pressure flash tank 7 operating at pressure of 25—600 p.s.i.a. Solvent temperature here is about 5° F. below the temperature at the bottom of the absorber. The gas, from flash tank 7, containing methane and carbon dioxide is pumped through line 8 to the absorber. Practically all of the hydrogen sulfide and the bulk of the carbon dioxide remain in the effluent solvent which passes from the high-pressure flash tank 7 through line 9 into preheater 10 where it is heated to about 100° F., then through line 11 to low-pressure flash tank 12 operating at pressures of 12—36 p.s.i.a. Solvent temperature here is about 90° F. The gas passing through line 13 from the low-pressure flash tank is chiefly carbon dioxide. The residual solvent contains about 1 weight percent carbon dioxide; most of the hydrogen sulfide remains in the solvent. About 20—95 weight percent of the solvent then passes through line 14 from the low-pressure flash tank 12 through cooler 15 where it is cooled to 45°—70° F., then through line 2 to absorber 3.

The residual solvent from low-pressure flash tank 12, amounting to 5—10 percent of the total solvent, passes through line 16 to preheater 17 where it is heated to about 110° F., then through line 18 to the top of stripper 19 which can be operated either at atmospheric or lower pressure. Solvent temperatures in the stripper are preferably 100°—190° F. A flow of heated air is passed through line 20 into the stripper to aid desorption of the hydrogen sulfide. Stripping reduces the hydrogen sulfide concentration in the solvent to a few parts per million. The effluent gas and air mixture passes through line 21. The purified solvent passes from the bottom of stripper 19 through line 22 into cooler 23 where it is cooled to 45°—70° F., then through line 1 to absorber 3. Stripping may be accomplished by other suitable methods as for example (a) vacuum stripping, (b) use of an inert gas such as nitrogen or methane, and (c) multiple flash stripping to effect removal of undesired gases.

The invention will be described further in conjunction with the following examples which are not intended to be limitative in nature.

EXAMPLE I

PREPARATION OF A MIXTURE OF MONOMETHYL ETHERS OF POLYETHYLENE GLYCOLS

A carbon steel reactor equipped with means for heating and cooling was charged with 7 lbs. of 50 weight percent aqueous sodium hydroxide and 865 lbs. of methanol. The mixture was heated to 110° C., and 5,300 lbs. of ethylene oxide was added to the mixture over a period of several hours. Reaction temperature was maintained at 110°–140° C. by cooling. The pressure remained below 150 p.s.i.a. The resulting mixture was then cooled to 60° C. and stored. This crude product had an average molecular weight of 231 and contained monomethyl ethers of mono- through nonaethylene glycols.

The crude product was batch distilled in a 10-plate column operating at a pressure of 10 mm. Hg and a reflux ratio of 1. Lights were removed until the overhead temperature of the column reached about 155° C. The column bottoms were taken as product and had the following composition:

Monomethyl ether of triethylene glycol, wt. %—8
Monomethyl ether of tetraethylene glycol, wt. %—23
Monomethyl ether of pentaethylene glycol, wt. %—25
Monomethyl ether of hexaethylene glycol, wt. %—21
Monomethyl ether of heptaethylene glycol, wt. %—13
Monomethyl ether of octaethylene glycol, wt. %—8
Monomethyl ether of nonaethylene glycol, wt. %—2

Average molecular weight of this mixture of monomethyl ethers of polyethylene glycols was about 265.

EXAMPLE II

PREPARATION OF A MIXTURE OF DIMETHYL ETHERS OF POLYETHYLENE GLYCOLS

A stainless steel reactor equipped with means for agitating, heating, and cooling was charged with 1,080 lbs. of monomethyl ethers of polyethylene glycols prepared in Example I and having an average molecular weight of about 265. About 4.6 lbs. of water was added and the mixture was agitated and heated to 110° C. About 95 lbs. of molten sodium at 135°–140° C. was added to the mixture over a period of several hours while the mixture was maintained at about 120°–130° C. by cooling. Hydrogen formed during the reaction was vented. The reaction yielded the sodium alcoholate of the monomethyl ethers of polyethylene glycol.

Next, 240 lbs. of methyl chloride was added to the reaction mixture over a period of several hours while the reaction mixture was maintained at about 115°–125° C. by cooling. The resulting reaction yielded sodium chloride and the dimethyl ethers of polyethylene glycols. The sodium chloride was separated from the reaction mixture in a centrifuge, and the resulting liquid product was stripped with natural gas to remove any excess methyl chloride. The stripped product was filtered, allowed to stand 24 hours and refiltered to remove any residual sodium chloride. This product may be distilled, if desired, but distillation is not necessary. The undistilled product had the following composition:

Dimethyl ether of triethylene glycol, wt. %—8
Dimethyl ether of tetraethylene glycol, wt. %—23
Dimethyl ether of pentaethylene glycol, wt. %—25
Dimethyl ether of hexaethylene glycol, wt. %—21
Dimethyl ether of heptaethylene glycol, wt. %—13
Dimethyl ether of octaethylene glycol, wt %—1
Dimethyl ether of nonaethylene glycol, wt. %—1
Water —1

The properties of the undistilled, filtered product and the same product further purified by distillation are compared as follows:

|  | Filtered Product | Distilled Product |
|---|---|---|
| $CO_2$ Solubility, wt. % |  |  |
| At 215 p.s.i.a. partial pressure at 70° F | 9.8 | 9.8 |
| At 900 p.s.i.a. partial pressure at 70° F. | 19.3 | 19.5 |
| $H_2S$ Solubility, wt. % |  |  |
| At 39 p.s.i.a. partial pressure at 70° F. | 8.7 | 9.0 |
| At 70 p.s.i.a. partial pressure at 70° F. | 15.6 | 15.8 |
| Chlorides, p.p.m. | 8 | 8 |
| Viscosity, centipoises at 82° F. | 7.9 | 7.7 |
| Density, lbs./gal. at 82° F. | 8.6 | 8.5 |

It was discovered that dissolved carbon dioxide lowers the viscosity of the instant solvent composition, as shown in the following table:

Effect of Dissolved Carbon Dioxide on Viscosity of Solvent

| Partial Pressure of $CO_2$, p.s.i.a. | Temperature °F. | Viscosity, Centipoises |
|---|---|---|
| 0 | 59 | 8.3 |
| 0 | 90 | 4.7 |
| 113 | 59 | 5.2 |
| 513 | 59 | 2.1 |

EXAMPLE III

REMOVAL OF HYDROGEN SULFIDE FROM NATURAL GAS MIXTURES

The following example is described with particular reference to the drawing. The solvent used in this example was prepared in accordance with Example II.

The absorption column 3 used in this example consisted of a lower or "semilean" section about 12 feet in diameter with 25 shower-deck trays having 18-inch tray spacing, and an upper or "lean" section about 5 feet in diameter with 10 one-pass valve trays having 18-inch tray spacing.

Natural gas containing 128 p.p.m. hydrogen sulfide, 18 volume percent carbon dioxide and 81 volume percent methane entered the bottom of absorption column 3 through line 4 at a rate of 90,400 standard cubic feet per minute (s.c.f.m.). Lean solvent, which was recycled in the process, containing less than about 10 p.p.m. hydrogen sulfide and less than 1 weight percent carbon dioxide entered the top of absorption column 3 through line 1 at 300 gallons per minute. "Semilean" solvent, which was recycled in the process, containing about 1 weight percent carbon dioxide entered absorption column 3 through line 2 at a rate of 4,700 gallons per minute, line 2 being located at the top tray of the lower or "semilean" section of the absorption column. The column was operated at 1,040 p.s.i.a. and with solvent temperatures of 70° F. at the inlet and 90° F. at the exit.

The gas effluent leaving the absorption column 3 through line 5 contained 70,030 s.c.f.m. methane, 1,800 s.c.f.m. carbon dioxide, and less than 4 p.p.m. hydrogen sulfide. The effluent solvent from absorber 3 contained 5.9 weight percent carbon dioxide, about 0.94 percent methane and essentially all of the hydrogen sulfide in the natural gas fed to the column.

The solvent was then flashed in the high-pressure flash tank 7 at 460 p.s.i.a. and at a temperature of about 85° F. Desorbed gas was pumped to the absorber through line 8 and solvent was passed through line 9 to preheater 10 where it was heated to about 100° F. The solvent was then passed through line 11 to low-pressure flash tank 12 where it was flashed at 24 p.s.i.a. at a temperature of 90° F. Desorbed gas contained 14,325 s.c.f.m. carbon dioxide and 3,280 s.c.f.m. methane, and the solvent contained about 1 percent carbon dioxide. Most of this "semilean" solvent, amounting to 4,700 gallons per minute, was pumped through line 14 to cooler 15 where it was cooled to 70° F. then through line 2 to absorber 3, as previously described. The rest of the semilean solvent, amounting to about 300 gallons per minute, was passed through line 16 from the low-pressure flash tank 12 to preheater 17 where it was heated to 110° F. then passed through line 18 to the top of stripper 19. The stripper was a 20-foot column, 4 feet in diameter packed with 3-inch ceramic rings. The stripper was operated at 14.7 p.s.i.a. and with solvent temperature of about 110° F. Air at 125° F. was added at the rate of 2,500 s.c.f.m. at the bottom of the column to aid in stripping the hydrogen sulfide. The hydrogen sulfide in the solvent was reduced to about 10 p.p.m. The effluent gas and air mixture was vented through line 21. The "lean" well stripped solvent was passed from the stripper through line 22 to cooler 23 where it is cooled to 70° F. The cooled lean solvent was then recycled through line 1 to the top of absorption column 3, as previously described.

It will be understood that the low hydrogen sulfide content of the solvent at the top of the absorber is most critical with respect to obtaining purified natural gas containing 4 p.p.m. or less hydrogen sulfide. However, in this example, it is shown that 94 percent of the solvent from the low pressure flasher can be fed to an intermediate point in the absorber without being passed through the stripper. The economy of such operation is readily apparent.

This example demonstrates the preferred process of the present invention wherein carbon dioxide and hydrogen sulfide are removed from a natural gas containing the same. In purifying natural gas for pipeline transportation, the carbon dioxide in the purified gas may be relatively high, typically 2.5 to 5.0 volume percent, but the hydrogen sulfide must be reduced to a very low parts per million range. Standard pipeline specifications normally limit $H_2S$ content in fuel gas to 4—16 p.p.m. or less.

To reduce hydrogen sulfide concentration in the natural gas to 4 p.p.m. the gas must be scrubbed with solvent which is virtually free of dissolved acid gases. Such solvent is subject to extra processing, i.e., stripped as for example with air at advanced temperature. For the bulk removal of carbon dioxide, on the other hand, a partially stripped solvent will serve. Solvent containing 1—5 percent of dissolved carbon dioxide will be lean enough to reduce the carbon dioxide concentration of the natural gas to the 2.5—5.0 percent level. Sufficient stripping to produce solvent of this grade can be obtained merely by flashing at atmospheric pressure.

By using two solvent feeds to the absorber, one well stripped and the other partially stripped, a relatively economical process results. It is important that the bulk of the carbon dioxide is removed in the lower section of the absorption column, whose solvent feed consists of partially stripped solvent, semilean with respect to carbon dioxide content and comprising 90—95 percent of the total feed. Moreover, this semilean solvent contains sufficient dissolved carbon dioxide to lower its viscosity to 1—5 centipoises to permit relatively larger throughputs of gas and solvent in the column. An important effect of this reduced viscosity is to improve absorber efficiency, and hence overall plant absorption system efficiency.

We claim:

1. A process for removing acid gas from a gas mixture containing the same which comprises the steps of:
   a. contacting said gaseous mixture in a first absorption zone under superatmospheric pressure with a solvent comprising a mixture of dimethyl ethers of polyethylene glycols having dissolved therein at least 1 weight percent acid gas to effect absorption of most of the acid gas so as to partially purify the gas;
   b. contacting said partially purified gas from the first absorption zone in a second absorption zone under superatmospheric pressure with a solvent comprising a mixture of dimethyl ethers of polyethylene glycols containing less than 1 weight percent acid gas to produce a purified gas;
   c. passing the solvent containing dissolved gases from the second absorption zone to the first absorption zone;
   d. passing the solvent containing dissolved acid gas from the first absorption zone to a flashing zone maintained at a pressure substantially lower than that in the first absorption zone to effect liberation of most of the acid gas therefrom;
   e. withdrawing from said flashing zone gases liberated therein;
   f. passing a major portion of solvent containing at least 1 weight percent acid gas from said flashing zone to said first absorption zone;
   g. passing a minor portion of solvent containing at least 1 weight percent acid gas from said flashing zone to a stripping zone;
   h. stripping substantially all of the acid gas from said minor portion of solvent; and
   i. returning desorbed solvent to the second absorption zone for further contact with the gaseous mixture.

2. A process for removing hydrogen sulfide from a natural gas mixture containing methane, carbon dioxide, and hydrogen sulfide which comprises the steps of:
   a. contacting said gaseous mixture in a first absorption zone under superatmospheric pressure with a solvent comprising a mixture of dimethyl ethers of polyethylene glycols having dissolved therein at least 1 weight percent carbon dioxide to effect absorption of most of the hydrogen sulfide, carbon dioxide and a minor portion of the methane so as to partially purify the gas;
   b. contacting said partially purified gas from the first absorption zone in a second absorption zone under superatmospheric pressure with a solvent comprising a mixture of dimethyl ethers of polyethylene glycols essentially free of hydrogen sulfide and containing less than 1 weight percent carbon dioxide, to produce a purified gas containing no more than 10 p.p.m. hydrogen sulfide by volume and less than 5 percent carbon dioxide by volume;
   c. passing the solvent containing dissolved gases from the second absorption zone to the first absorption zone;
   d. passing the solvent containing dissolved hydrogen sulfide, carbon dioxide and methane from the first absorption zone to a flashing zone maintained at a pressure substantially lower than that in the first absorption zone to effect liberation of most of the carbon dioxide and methane therefrom;
   e. withdrawing from said flashing zone gases liberated therein;
   f. passing a major portion of solvent containing hydrogen sulfide and at least 1 weight percent carbon dioxide from said flashing zone to said first absorption zone;
   g. passing a minor portion of solvent containing hydrogen sulfide and at least 1 weight percent carbon dioxide from said flashing zone to a stripping zone maintained at a temperature of about 45°—210° F.;
   h. contacting said solvent in the stripping zone with an oxygen-containing gas to effect removal of substantially all of the hydrogen sulfide therefrom; and
   i. returning desorbed solvent to the second absorption zone for further contact with the gaseous mixture.

3. The process according to claim 2 wherein the produced purified gas contains no more than 4 p.p.m. hydrogen sulfide by volume.

4. The process according to claim 2 wherein the mixture of dimethyl ethers of polyethylene glycols has the general formula $CH_3O(C_2H_4O)_x CH_3$ wherein $x$ is 3—9 and the molecular homolog distribution in terms of $x$ is:

| $x$ | Molecular Homolog, wt. % |
|---|---|
| 3 | 4—9 |
| 4 | 22—24 |
| 5 | 24—28 |
| 6 | 20—22 |
| 7 | 13—15 |
| 8 | 6—8 |
| 9 | 2—4 |

5. The process according to claim 4 wherein the solvent fed to step (a) is recycled solvent and comprises a mixture of dimethyl ethers of polyethylene glycols having dissolved therein 1—3 weight percent carbon dioxide, and the purified gas produced in step (b) contains 2.5—5.0 percent carbon dioxide by volume.

6. A process according to claim 5 wherein the temperature of the stripping zone is about 100°—190° F. and the pressure of the stripping zone is substantially atmospheric.

7. A process according to claim 6 wherein the pressure in the absorption zones is 500—1,500 p.s.i.a. and the temperature is 45°—90° F.

8. A process according to claim 7 wherein 90—95 weight percent of the total solvent is fed to the first absorption zone as solvent containing 1—3 percent by weight carbon dioxide.